United States Patent
Morimoto et al.

(10) Patent No.: US 7,908,032 B2
(45) Date of Patent: Mar. 15, 2011

(54) DRIVING METHOD, DRIVE CONTROL APPARATUS, AND ROBOT

(75) Inventors: Jun Morimoto, Kizugawa (JP); Gen Endo, Tokyo (JP); Jun Nakanishi, Kizugawa (JP); Gordon Cheng, Soraku-gun (JP)

(73) Assignees: Sony Corporation, Tokyo (JP); Japan Science and Technology Agency, Sitama (JP); Advanced Telecommunications Research Institute International, Kyoto (JP)

( * ) Notice: Subject to any disclaimer, the term of this patent is extended or adjusted under 35 U.S.C. 154(b) by 950 days.

(21) Appl. No.: 11/799,201

(22) Filed: May 1, 2007

(65) Prior Publication Data

US 2007/0260355 A1 Nov. 8, 2007

(30) Foreign Application Priority Data

May 2, 2006 (JP) ................................ 2006-128372

(51) Int. Cl.
*G06F 19/00* (2006.01)
(52) U.S. Cl. ........................................................ 700/245
(58) Field of Classification Search .................. 700/245
See application file for complete search history.

(56) References Cited

U.S. PATENT DOCUMENTS

| | | | | |
|---|---|---|---|---|
| 5,151,859 A | * | 9/1992 | Yoshino et al. ................... 701/23 |
| 5,221,883 A | * | 6/1993 | Takenaka et al. ......... 318/568.12 |
| 5,255,753 A | * | 10/1993 | Nishikawa et al. ............. 180/8.6 |
| 5,432,417 A | * | 7/1995 | Takenaka et al. ........ 318/568.12 |
| 5,936,367 A | * | 8/1999 | Takenaka ................. 318/568.12 |
| 6,301,524 B1 | * | 10/2001 | Takenaka ....................... 700/245 |
| 2004/0133308 A1 | * | 7/2004 | Kato et al. ..................... 700/245 |
| 2005/0021176 A1 | * | 1/2005 | Takenaka et al. ............. 700/245 |
| 2009/0069941 A1 | * | 3/2009 | Honda et al. .................. 700/258 |

OTHER PUBLICATIONS

Endo et al. "Experimental Studies of a Neural Oscillator for Biped Locomotion with QRIO" Proceedings of the 2005 IEEE, International Conference on Robotics and Automation, Barcelona, Spain, Apr. 2005.

Morimoto et al. "Modulation of simple sinusoidal patterns by a coupled oscillator model for biped walking".

* cited by examiner

*Primary Examiner* — Khoi Tran
*Assistant Examiner* — Kyung J Kim
(74) *Attorney, Agent, or Firm* — Leason Ellis LLP.

(57) ABSTRACT

A robot has a plurality of limbs with joints; a driving section for driving the joints periodically to form periodic movements on a floor by means of the plural limbs; and a controller capable of performing various operations. The operations include detecting over time floor reaction forces received through the plural limbs contacting the floor during the periodic movement; deriving a center position of the floor reaction forces received from ground contacting limbs during movement and a change in the center position over time; calculating desired angles of the plural joints directly based on the derived current center position, without deriving a desired center position indicating the center position at a future time, controlling the plural joints based on the calculated desired angles; and driving the robot with the controlled plural joints.

20 Claims, 9 Drawing Sheets

DRIVING METHOD, DRIVE CONTROL APPARATUS, AND ROBOT

CROSS-REFERENCE TO RELATED APPLICATIONS

This Nonprovisional application claims priority under 35 U.S.C. §119(a) on Patent Application No. 2006-128372 filed in Japan on May 2, 2006, the entire contents of which are hereby incorporated by reference.

TECHNICAL FIELD

The present invention relates to: a driving method for controlling a drive mechanism for the joints of a robot that performs periodic movement by periodic driving of the joints of a plurality of limbs; a drive control apparatus employing this control method; and a robot employing this driving method. In particular, the present invention relates to a driving method, a drive control apparatus, and a robot in which periodic movement such as walking and stepping is stabilized in a robot such as a biped walking robot having a pair of limbs.

BACKGROUND

Recently, researches and development works for biped walking robots that perform walking movement in which a human walking pattern is imitated are conducted in various companies and development organizations. When a biped walking robot performs walking movement in which a human walking pattern is imitated, the control of balance at the time of walking is necessary in order to achieve stable walking movement.

The control of balance at the time of walking in a biped walking robot is performed by controlling the upper half body and the lower half body of the robot such that the robot should stably walk on the center of floor reaction forces which are the reaction forces received by the robot from the floor at the time of walking. Specifically, during the time after the walking robot raises one leg until lands it, the upper half body and the lower half body are controlled such that the center of floor reaction forces should be located within the foot on the ground contacting side, so that the control of balance at the time of walking is performed. Further, in order that the robot should walk smoothly without falling, the acceleration of the robot at the time of walking need be synchronized with the movement of the limbs. Thus, at each time that a foot of the robot lands, the movement of the foot on the landed side is synchronized with the acceleration of the robot such as to be continued smoothly to the subsequent walking movement.

Nevertheless, in the control for walking in a biped walking robot in the prior art, the robot has been controlled such that the center of floor reaction forces should be located at a desired position. This has caused a problem that complicated calculations are necessary. In particular, the complicated calculations in the control for walking have become necessary at each time that various factors such as the shape, the size, the mass distribution, the speed, and the acceleration that depend on the robot and various factors such as a coefficient of friction, a level difference, and an inclination that depend on the floor on which the robot walks have varied. This has caused a problem of huge calculation cost.

Further, in the prior art method in which the hip position is controlled by inverse kinematics such that the center of floor reaction forces should be located at a desired position, in order that singularity should be avoided in the inverse kinematics arithmetic operation, the walking has been performed in a state that the knee joints of the limbs are bent. This has caused a problem of unnaturalness in the appearance of the walking state. Further, in the state that the knee joints are bent, an excessive load occurs in the motor for driving each joint. This has caused a problem in the durability and a problem of increase in the power cost.

Furthermore, when synchronizing is performed at the time of landing of a foot of the robot, the timing of synchronization becomes intermittent. Thus, the calculation results concerning the synchronization become discrete. This has caused a problem that smooth walking in the entire walking movement becomes difficult.

SUMMARY

The present invention has been devised in view of this situation. An object of the present invention is to provide a driving method comprising the steps of deriving the center position of floor reaction forces received from the floor by a robot during the movement such as walking and a change in the center position; calculating a phase concerning periodic movement of dynamical system elements of the robot on the basis of the center position and the change in the center position having been derived; calculating a phase of control system elements for controlling the periodic movement of the robot, on the basis of the calculated phase of the dynamical system elements of the robot; calculating a desired value of the angle of the joints on the basis of the calculated phase of the control system elements; and performing control, whereby calculation cost for walking is reduced, while the appearance of walking movement is made natural and smooth, and while loads to motors are reduced. A drive control apparatus employing this driving method and a robot employing this driving method are also provided.

The driving method according to the present invention is characterized by a driving method for joints of a robot that performs periodic movement by periodic driving of joints of a plurality of limbs, comprising the steps of deriving a center position of reaction forces received by the robot from ground contacting parts and a change in the center position; calculating a phase concerning periodic movement of dynamical system elements of the robot on the basis of the center position and the change in the center position having been derived; calculating a phase of control system elements for controlling the periodic movement of the robot, on the basis of the calculated phase of the dynamical system elements of the robot; calculating a desired value of an angle of the joints on the basis of the calculated phase of the control system elements; and driving the joints on the basis of the calculated desired value of the angle.

According to the present invention, a desired drive value of the angle of the joints of the limbs is calculated on the basis of variables such as the center position of floor reaction forces derived during the movement such as walking and stepping of the robot. Thus, the movement of the limbs can be synchronized with the center position of the floor reaction forces during the movement and with the change in the center position. This permits absorption of influences of various factors such as the shape, the size, the mass distribution, the speed, and the acceleration that depend on the robot and various factors such as a coefficient of friction, a level difference, and an inclination that depend on the floor on which the robot walks. Further, inverse kinematics is not used in the control of the center position of the floor reaction forces. Thus, no singularity problem arises, and hence the joints of the robot can be stretched. Furthermore, synchronous processing is performed continuously during the movement. This permits smooth movement.

The drive control apparatus according to the present invention is characterized by a drive control apparatus for controlling a drive mechanism for joints of a robot that performs periodic movement by periodic driving of joints of a plurality of limbs, comprising: means for deriving a center position of reaction forces received by the robot from ground contacting parts and a change in the center position; means for calculating a phase concerning periodic movement of dynamical system elements of the robot on the basis of the center position and the change in the center position having been derived; means for calculating a phase of control system elements for controlling the periodic movement of the robot, on the basis of the calculated phase of the dynamical system elements of the robot; means for calculating a desired value of an angle of the joints on the basis of the calculated phase of the control system elements; and means for outputting the calculated desired value of the angle as a desired control value to the drive mechanism.

According to the present invention, a desired drive value of the angle of the joints of the limbs is calculated on the basis of variables such as the center position of floor reaction forces derived during the movement such as walking and stepping of the robot. Thus, the movement of the limbs can be synchronized with the center position of the floor reaction forces during the movement and with the change in the center position. This permits absorption of influences of various factors such as the shape, the size, the mass distribution, the speed, and the acceleration that depend on the robot and various factors such as a coefficient of friction, a level difference, and an inclination that depend on the floor on which the robot walks. Further, inverse kinematics is not used in the control of the center position of the floor reaction forces. Thus, no singularity problem arises, and hence the joints of the robot can be stretched. Furthermore, synchronous processing is performed continuously during the movement. This permits smooth movement.

The robot according to the present invention is characterized by a robot that has a plurality of limbs and that performs periodic movement by periodic driving of joints of the limbs, comprising: deriving means for deriving a center position of reaction forces received from ground contacting parts and a change in the center position; means for calculating a phase concerning periodic movement of own dynamical system elements on the basis of the center position and the change in the center position having been derived; phase calculating means for calculating a phase of control system elements for controlling the periodic movement, on the basis of the phase of own dynamical system elements; angle calculation means for calculating a desired value of the angle of the joints on the basis of the calculated phase of the control system elements; and means for driving the joints on the basis of the calculated desired value of the angle.

According to the present invention, a desired drive value of the angle of the joints of the limbs is calculated on the basis of variables such as the center position of floor reaction forces derived during the movement. Thus, the movement of the limbs can be synchronized with the center position of the floor reaction forces during the movement and with the change in the center position. This permits absorption of influences of various factors such as the shape, the size, the mass distribution, the speed, and the acceleration that depend on its design and various factors such as a coefficient of friction, a level difference, and an inclination that depend on the floor. Further, inverse kinematics is not used in the control of the center position of the floor reaction forces. Thus, no singularity problem arises, and hence the joints can be stretched. Furthermore, synchronous processing is performed continuously during the movement. This permits smooth movement.

The robot according to the present invention is characterized in that said periodic movement performed by driving of the joints of the limbs is walking movement or stepping movement.

The present invention is applicable to walking movement and stepping movement.

The robot according to the present invention is characterized in that said limb has a hip joint, a knee joint, and an ankle joint.

When the present invention is applied to walking movement and stepping movement in which three joints are driven, a human walking pattern can be imitated.

The robot according to the present invention is characterized by a configuration that means for detecting a load to said limb is further provided and that said deriving means derives a center position on the basis of the detected loads.

According to the present invention, when the center position of floor reaction forces is derived on the basis of the loads to the limbs, the center position of the floor reaction forces can easily be derived in real time.

The robot according to the present invention is characterized by a configuration that said phase calculating means performs calculation by using a sinusoidal function the variable of which is the difference between the phase of the dynamical system elements and the phase of the control system elements.

According to the present invention, calculation is performed on the basis of a sinusoidal function. This permits the use of a general-purpose calculation circuit. Further, since the function is continuous, smooth movement is realized.

The robot according to the present invention is characterized by a configuration that said angle calculating means calculates a desired value of the angle of the joints on the basis of a sinusoidal function the variable of which is the phase concerning the control.

According to the present invention, since a sinusoidal function which is continuous is used, smooth movement is realized. Further, a general-purpose calculation circuit can be used.

In the driving method, the drive control apparatus, and the robot according to the present invention, in a case that a robot having a plurality of limbs performs periodic movement such as walking and stepping: a center position of floor reaction forces received from ground contacting parts of the limbs and a change in the center position are derived, for example, on the basis of loads to the limbs; a phase concerning periodic movement of dynamical system elements of the robot is calculated on the basis of the center position and the change in the center position having been derived; a phase of control system elements for controlling the periodic movement of the robot is calculated on the basis of the calculated phase of the dynamical system elements of the robot; a desired value of the angle of the joints such as a hip joint, a knee joint, and an ankle joint provided in the limb is calculated on the basis of the calculated phase of the control system elements; and control is performed.

According to this configuration, in the present invention, control system elements such as the movement of the limbs can be synchronized with dynamical system elements such as a change in the center position of the floor reaction forces during the movement, so that balance can be established and stabilized between the dynamical system elements and the control system elements of the robot at the time of periodic movement. This permits absorption of influences of various factors such as the shape, the size, the mass, the mass distribution, the speed, and the acceleration that depend on the robot and various factors such as a coefficient of friction, a level difference, and an inclination that depend on the floor on which the robot walks. This avoids the necessity of performing at each time the complicated calculations depending on the factors corresponding to the design of the robot and the floor. This provides an excellent effect such as a reduction in the calculation cost. Further, according to the present invention, even when walking is performed on floors having different factors, the influence of the floors is absorbed so that stable walking movement is realized in a manner autonomously adapted to various floors. Such an excellent effect is obtained.

Further, according to the present invention, inverse kinematics is not used when the center position of the floor reaction forces is controlled. Thus, no singularity problem arises, and hence the joints of the robot can be stretched. This provides an excellent effect of realizing walking movement having natural appearance. Further, in the present invention, since the joints of the robot can be stretched, a load to the motor for driving each joint can be reduced. This provides excellent effects such as improvement in the durability of the motor and a reduction in the power cost.

Furthermore, in the present invention, synchronous processing is continuously performed during the movement. Thus, in particular, when a continuous function such as a sinusoidal function and a linear function is used in the calculation necessary for the synchronization, an excellent effect such as smooth movement is obtained. Further, the calculation using a sinusoidal function can be realized by a general-purpose calculation circuit. This provides an excellent effect of reduction in the design and the production cost.

The above and further objects and features of the invention will more fully be apparent from the following detailed description with accompanying drawings.

DETAILED DESCRIPTION

Figure 1:
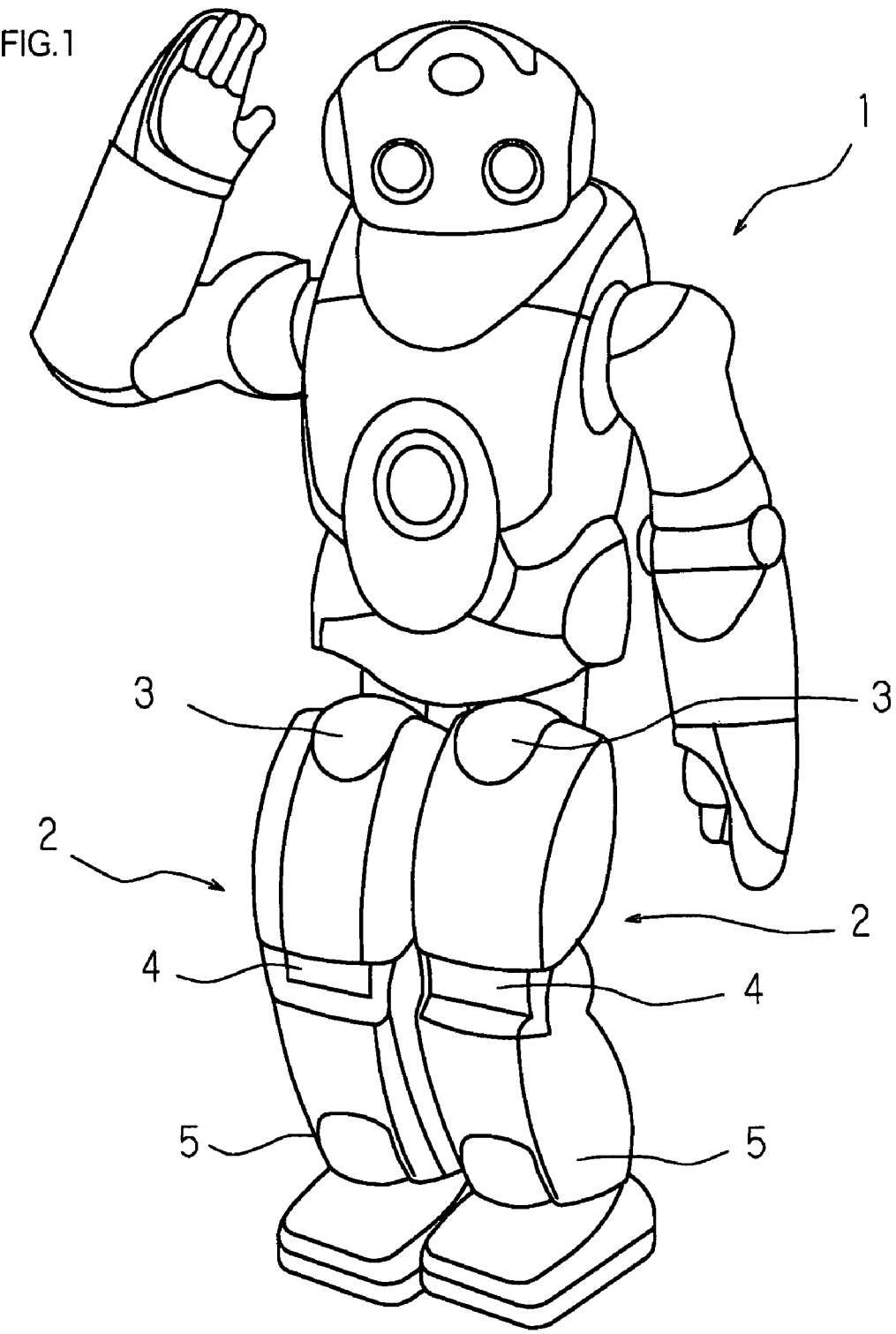
FIG. 1 is an external appearance view showing a robot of the present embodiment.
Figure 2:
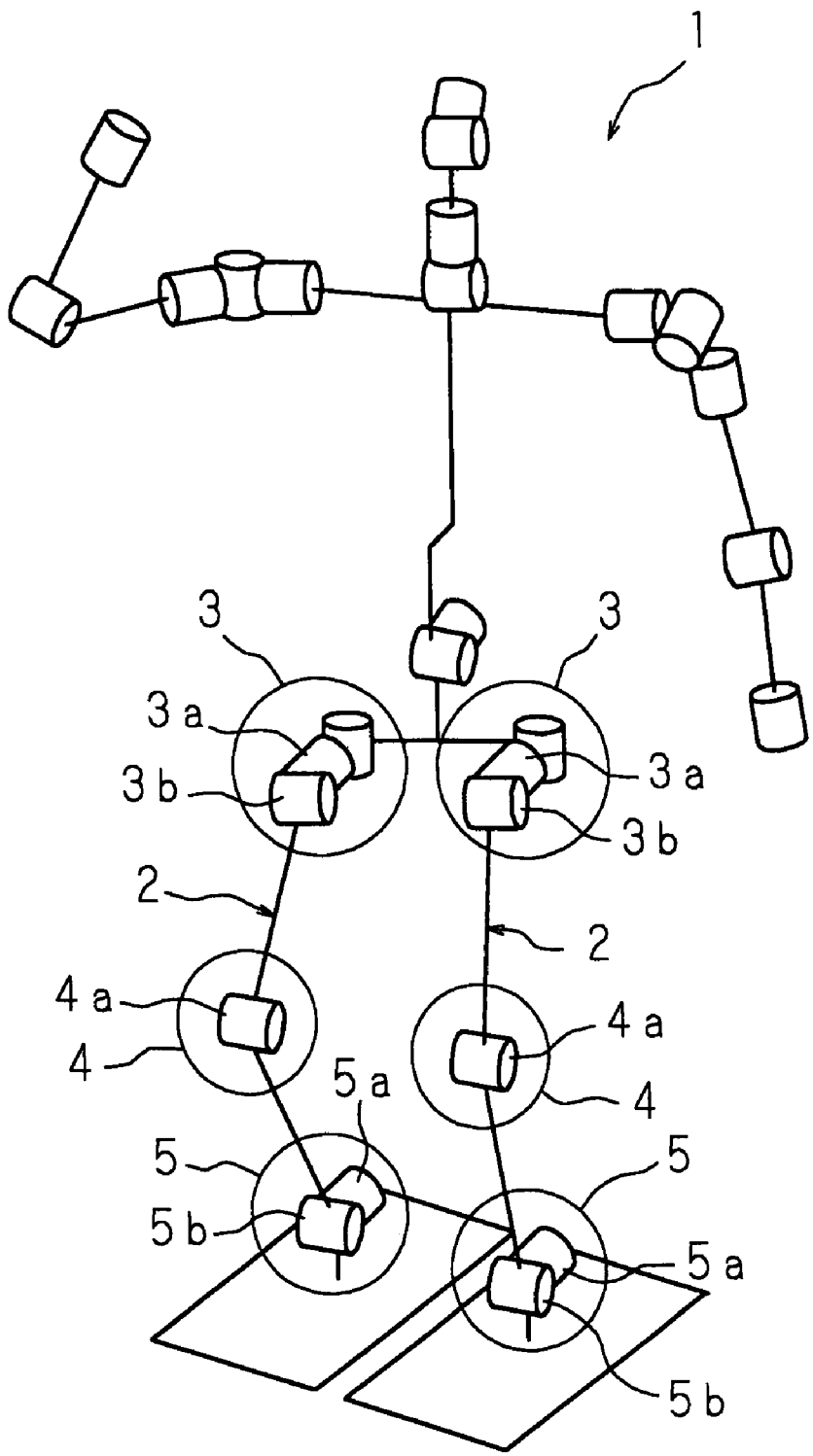
FIG. 2 is a block diagram showing schematically the skeleton and the joints of a robot of the present embodiment.

The present embodiment is described below in detail with reference to the drawings showing an embodiment. FIG. 1 is an external appearance view showing a robot of the present embodiment. FIG. 2 is a block diagram showing schematically the skeleton and the joints of a robot of the present embodiment. In FIGS. 1 and 2, numeral 1 indicates a robot. The robot 1 is a biped walking robot that has a pair of limbs 2 and 2 in the left and right and that performs periodic movement such as walking and stepping by periodic driving of the limbs 2 and 2.

The left and right limbs 2 and 2 of the robot 1 have hip joint drive mechanisms 3 and 3, knee joint drive mechanisms 4 and 4, and ankle joint drive mechanisms 5 and 5 each composed of a servo motor serving as a hip joint, a knee joint, or an ankle joint, respectively. The hip joint drive mechanism 3 has: a hip joint lateral motor 3a for causing the hip joint to swing left and right; and a hip joint forward-backward motor 3b for causing the hip joint to swing forward and backward. The knee joint drive mechanism 4 has a knee joint forward-backward motor 4a for causing the knee joint to swing forward and backward. The ankle joint drive mechanism 5 has: an ankle joint lateral motor 5a for causing the ankle joint to swing left and right; and an ankle joint forward-backward motor 5b for causing the ankle joint to swing forward and backward.

Figure 3:
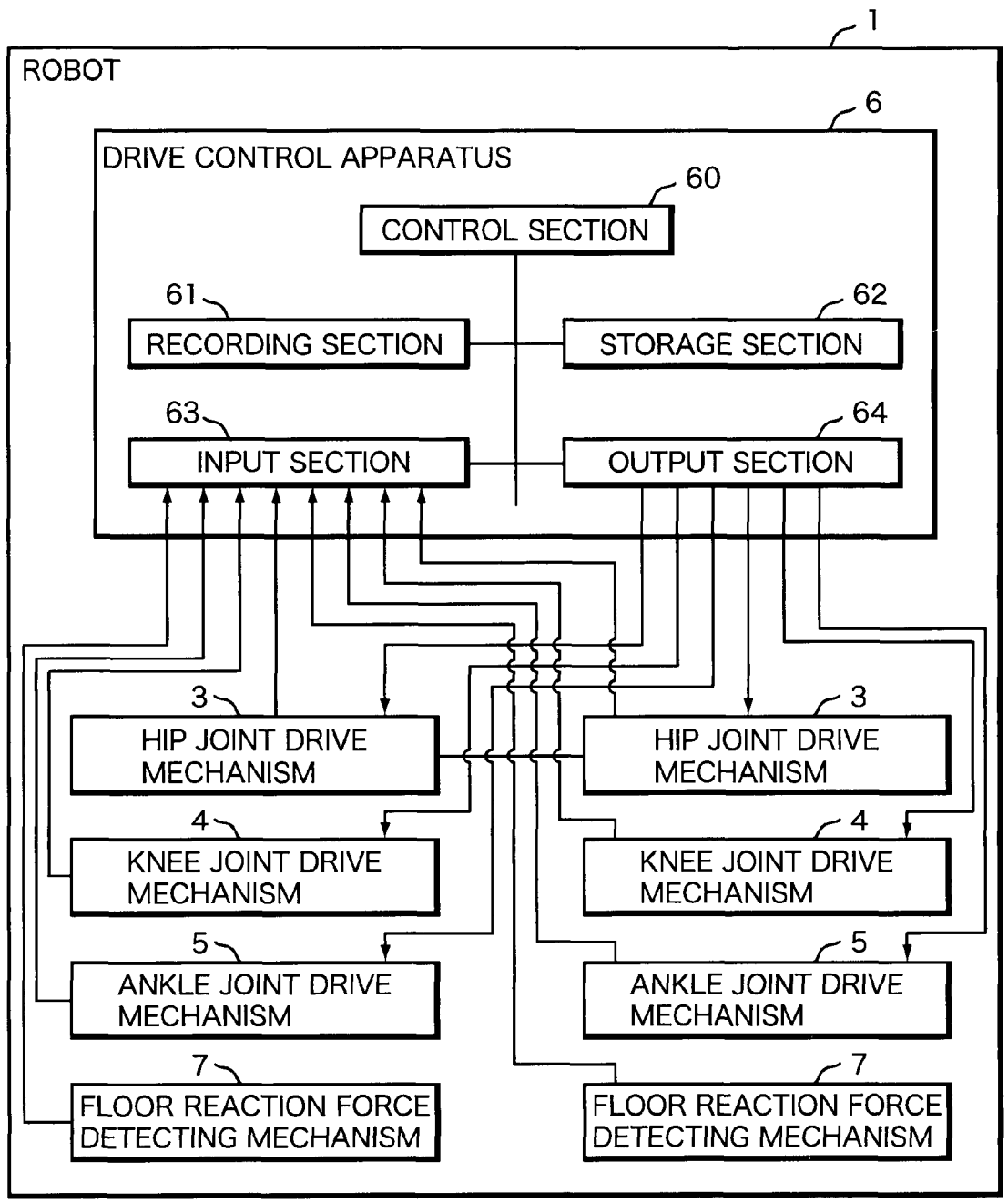
FIG. 3 is a block diagram showing a configuration of a robot of the present embodiment.

FIG. 3 is a block diagram showing a configuration of a robot 1 of the present embodiment. The robot 1 has a drive control apparatus 6 for controlling the hip joint drive mechanisms 3 and 3, the knee joint drive mechanisms 4 and 4, and the ankle joint drive mechanisms 5 and 5. The drive control apparatus 6 has: control section 60 composed of a CPU or the like; recording section 61 composed of a ROM, an EPROM, a hard disk, or the like for recording information such as programs and data necessary for the control; storage section 62 composed of RAM or the like for temporarily storing data generated by execution of the programs; input section 63 for receiving signals from other mechanisms; and output section 64 for outputting signals to other mechanisms. Here, the control section 60 has a co-processor for the purpose of speed-up of particular calculations.

The signals outputted from the drive control apparatus 6 to the hip joint drive mechanisms 3 and 3, the knee joint drive mechanisms 4 and 4, and the ankle joint drive mechanisms 5 and 5 are, for example, control signals that indicate a desired angle for each motor. Further, the signals received by the drive control apparatus 6 from the hip joint drive mechanisms 3 and 3, the knee joint drive mechanisms 4 and 4, and the ankle joint drive mechanisms 5 and 5 are, for example, feedback signals that indicate a state such as the angle of each motor. Each motor provided in the mechanism concerning each joint operates on the basis of the control signal for a desired angle and the like inputted from the drive control apparatus 6, and detects the angle so as to output it as a feedback signal to the drive control apparatus 6.

Further, the limbs 2 and 2 of the robot 1 have floor reaction force detecting mechanisms 7 and 7 for detecting respectively the loads acting on the ground contacting surfaces as reaction forces from the floor, that is, the floor reaction forces. The floor reaction forces detected by the floor reaction force detecting mechanisms 7 and 7 are outputted to the drive control apparatus 6.

Next, the control of periodic movement of the robot 1 of the present embodiment is described below. In the robot 1 of the present embodiment, the loads acting on the ground contacting surfaces of the left and right limbs 2 and 2 at the time of periodic movement are detected as the floor reaction forces by the floor reaction force detecting mechanisms 7 and 7. From the detected left and right floor reaction forces, the drive control apparatus 6 derives the floor reaction force center point and the amount of change per unit time of the floor reaction force center point.

Figure 4A:
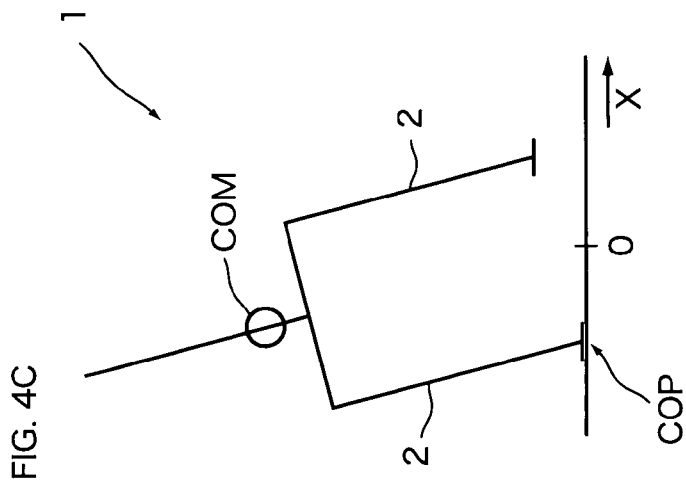
FIGS. 4A to 4C are explanation diagrams showing schematically a floor reaction force center point according to a robot of the present embodiment.
Figure 4B:
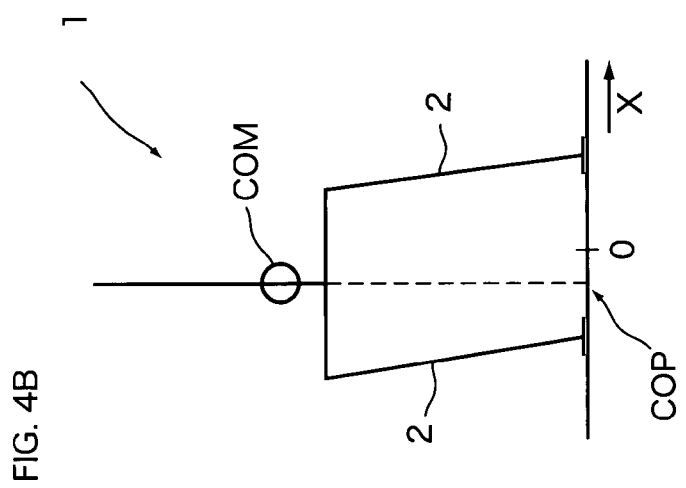
Figure 4C:
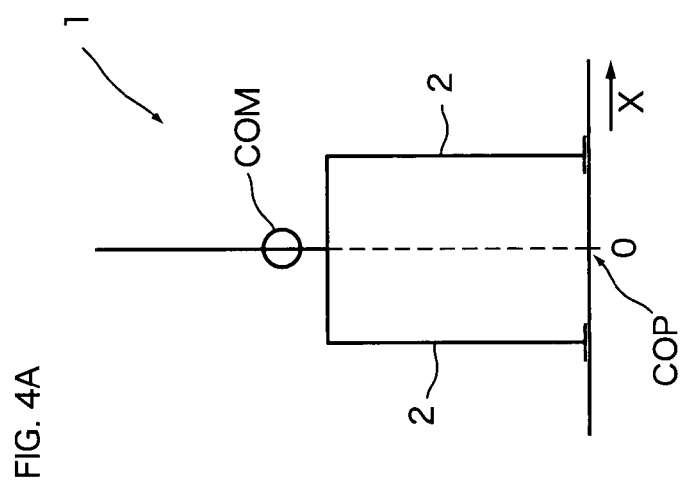

FIGS. 4A to 4C are explanation diagrams showing schematically a floor reaction force center point according to a robot of the present embodiment. FIGS. 4A to 4C show schematically the state of the robot 1 viewed from the front. In FIGS. 4A to 4C, COM (Center of Mass) indicates the center of gravity of the robot 1, while COP (Center of Pressure) indicates the floor reaction force center point. FIG. 4A shows a state that the robot 1 stands up, which is viewed from the front. FIG. 4B shows a state that the robot 1 inclines to the right (the left when facing the figure). FIG. 4C shows a state that the left limb 2 of the robot 1 departs from the floor and hence the entirety is supported solely by the right limb 2. In FIGS. 4A to 4C, the floor reaction force center point COP is expressed by a one-dimensional coordinate x defined as zero at the stand-up position and as positive in the left side direction of the robot 1.

In a stand-up state shown in FIG. 4A, the center of gravity COM is located in the middle of the limbs 2 and 2, and hence the coordinate of the position of the floor reaction force center point COP is 0. As shown in FIG. 4B, when the robot 1 inclines to the right, the coordinate of the position of the floor reaction force center point COP varies in the negative direction. Further, as shown in FIG. 4C, when the left limb 2 of the robot 1 departs from the floor, the entire weight of the robot 1 is loaded on the ground contacting right limb 2. Further, the position of the floor reaction force center point COP is located at the ground contacting position, such as the position of the ankle or the heel, of the right limb 2 where the load acts.

The coordinate x of the floor reaction force center point COP can be derived by the following Formula 1 on the basis of the loads detected by the floor reaction force detecting mechanisms 7 and 7.

$$x = (x^l_{foot} \cdot F^l_z + x^r_{foot} \cdot F^r_z)/(F^r_z + F^l_z)$$ Formula 1 where x: coordinate of the floor reaction force center point, $x^l_{foot}$: x-coordinate of the ground contacting position of the left limb 2 of the robot 1, $x^r_{foot}$: x-coordinate of the ground contacting position of the right limb 2 of the robot 1, $F^l_z$: load from the ground contacting surface to the left limb 2 of the robot 1, and $F^r_z$: load from the ground contacting surface to the right limb 2 of the robot 1.

Further, the drive control apparatus 6 provided in the robot 1 derives the amount of change per unit time of the coordinate x of the floor reaction force center point on the basis of the result of continuous derivation of the x-coordinate of the floor reaction force center point. Furthermore, on the basis of the floor reaction force center point and the amount of change of the floor reaction force center point having been derived, the drive control apparatus 6 provided in the robot 1 calculates a phase concerning the periodic movement such as various natural oscillations of the dynamical system elements such as the height of the center of gravity, the mass, and the inertia of the robots 1 according to the following Formula 2.

$$\phi_r(x) = \arctan\{(dx/dt)/x\}$$ Formula 2 where $\phi_r(\ )$: function that indicates the phase concerning the periodic movement of the dynamical system elements of the robot 1, and dx/dt: amount of change per unit time of the coordinate x of the floor reaction force center point.

The phase $\phi_r$ of the dynamical system elements of the robot 1 calculated according to Formula 2 is an internal variable that indicates the phase concerning the periodic movement such as various natural oscillations of the control system elements such as the drive control apparatus 6 as shown by the equation of the following Formula 3.

$$d\phi_c/dt = \omega_c + K_c \sin(\phi_r - \phi_c)$$ Formula 3 where $\phi_c$: phase of the drive control apparatus 6, $d\phi_c/dt$: amount of change per unit time of the phase of the drive control apparatus 6, $\omega_c$: angular frequency concerning the periodic movement of the drive control apparatus 6, and $K_c$: positive coupling coefficient of the drive control apparatus 6.

In Formula 3, the angular frequency $\omega_c$ of the drive control apparatus 6 is a variable given in advance, and is a natural angular frequency of the drive control apparatus 6. The positive coupling coefficient $K_c$ is a constant given in advance. Formula 3 shows calculation of the amount of change $d\phi_c/dt$ of the phase of the drive control apparatus 6 necessary for synchronizing the phase $\phi_c$ of the drive control apparatus 6 with the phase $\phi_r$ of the robot 1. Thus, when the amount of change $d\phi_c/dt$ of the phase of the drive control apparatus 6 obtained according to the equation of Formula 3 is numerically integrated, the phase $\phi_c$ concerning the periodic movement of the drive control apparatus 6 is obtained. The calculated phase $\phi_c$ is used for calculation of a desired angle of control for the motor of each joint concerning the periodic movement of the robot 1.

Figure 5A:
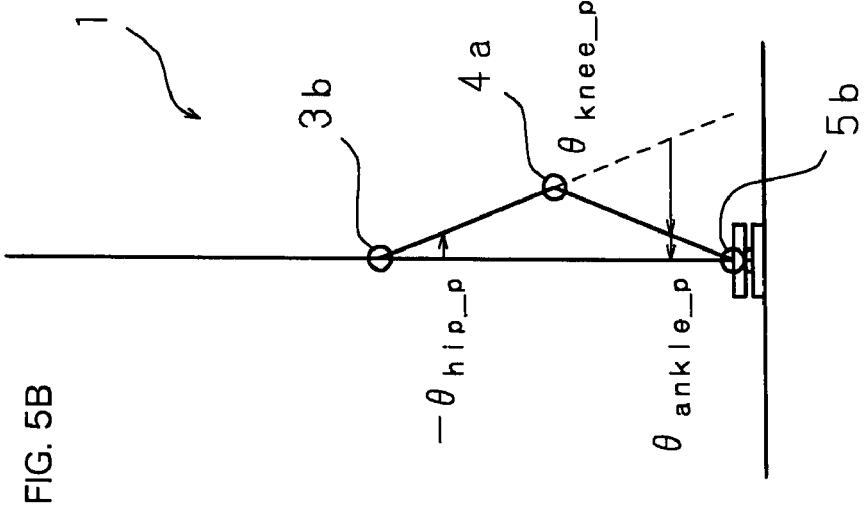
FIGS. 5A and 5B are explanation diagrams showing schematically a state of limbs at the time of periodic movement of a robot of the present embodiment.
Figure 5B:
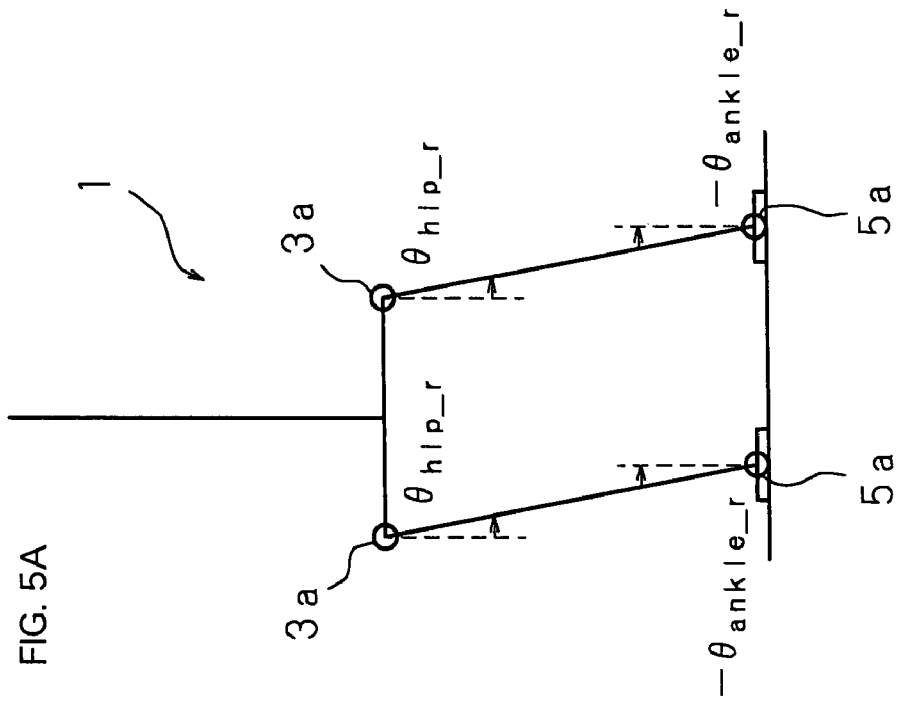

FIGS. 5A and 5B are explanation diagrams showing schematically a state of limbs 2 at the time of periodic movement of a robot 1 of the present embodiment. FIGS. 5A and 5B show the state of the limbs when stepping movement is performed as the periodic movement. FIG. 5A shows schematically the state of the robot 1 viewed from the front. FIG. 5B shows schematically the state of the robot 1 viewed from the right side.

FIG. 5A shows swing movement in the lateral direction of the robot 1 associated with stepping movement. This figure shows a state that the hip joint lateral motors 3a and 3a of the left and right limbs 2 and 2 swing at an angle of $\theta_{hip\_r}$ and that the ankle joint lateral motors 5a and 5a swing at an angle of $-\theta_{ankle\_r}$. FIG. 5B shows swing movement for generating a departing duration for the right limb 2 in the stepping movement. This figure shows a state that the hip joint forward-backward motor 3b of the right limb 2 swings at an angle of $-\theta_{hip\_p}$, that the knee joint forward-backward motor 4a swings at an angle of $\theta_{knee\_p}$, and that the ankle joint forward-backward motor 5b swings at an angle of $\theta_{ankle\_p}$.

In the stepping movement, the desired value for control of the angle $\theta_{dip\_r}$ of the hip joint lateral motor 3a shown in FIG. 5A and the desired value for control of the angle $\theta_{ankle\_r}$ of the ankle joint lateral motor 5a are calculated by the drive control apparatus 6 from the following Formulas 4 and 5 on the basis of the phase $\phi_c$ concerning the periodic movement of the drive control apparatus 6 calculated according to Formula 3.

$$\theta^d_{hip\_r}(\phi_c) = A_{hip\_r} \sin(\phi_c)$$ Formula 4

$$\theta^d_{ankle\_r}(\phi_c) = -A_{ankle\_r} \sin(\phi_c)$$ Formula 5 where $\theta^d_{hip\_r}$: desired value of the angle of the hip joint lateral motor 3a, $\theta^d_{hip\_r}(\ )$: function that indicates a desired value of the angle $\theta_{hip\_r}$ of the hip joint lateral motor 3a, $A_{hip\_r}$: amplitude set up in advance for the sinusoidal function of the hip joint lateral motor 3a in the periodic movement, $\theta^d_{ankle\_r}$: desired value of the angle $\theta_{ankle\_r}$ of the ankle joint lateral motor 5a, $\theta^d_{ankle\_r}(\ )$: function that indicates a desired value of the angle $\theta_{ankle\_r}$ of the ankle joint lateral motor 5a, and $A_{ankle\_r}$: amplitude set up in advance for the sinusoidal function of the ankle joint lateral motor 5a in the stepping movement.

The desired value of the angle $\theta_{hip\_r}$ of the hip joint lateral motor 3a calculated according to Formula 4 and the desired value of the angle $\theta_{ankle\_r}$ of the ankle joint lateral motor 5a calculated according to Formula 5 are outputted from the drive control apparatus 6 to the hip joint drive mechanisms 3 and 3 and the ankle joint drive mechanisms 5 and 5, respectively. On the basis of the desired value of the angle $\theta_{hip\_r}$ and the desired value of the angle $\theta_{ankle\_r}$ having been received, the hip joint drive mechanism 3 and the ankle joint drive mechanism 5 respectively control the hip joint lateral motor 3a and the ankle joint lateral motor 5a so as to drive the hip joint and the ankle joint.

Further, the desired value for control of the angle $\theta_{hip\_p}$ of the hip joint forward-backward motor 3b of the right limb 2 shown in FIG. 5B, the desired value of the angle $\theta_{knee\_p}$ of the knee joint forward-backward motor 4a, and the desired value for control of the angle $\theta_{ankle\_p}$ of the ankle joint forward-backward motor 5b are calculated by the drive control apparatus 6 from the following Formulas 6, 7, and 8 on the basis of the phase $\phi_c$ concerning the periodic movement of the drive control apparatus 6 calculated according to Formula 3.

$$\theta^d_{hip\_p}(\phi_c) = A_p \sin(\phi_c) + \theta^{res}_{hip\_p} \quad \text{Formula 6}$$

$$\theta^d_{knee\_p}(\phi_c) = -2A_p \sin(\phi_c) + \theta^{res}_{knee\_p} \quad \text{Formula 7}$$

$$\theta^d_{ankle\_p}(\phi_c) = A_p \sin(\phi_c) + \theta^{res}_{ankle\_p} \quad \text{Formula 8}$$

where $\theta^d_{hip\_p}$: desired value of the angle $\theta_{hip\_p}$ of the hip joint forward-backward motor 3b, $\theta^d_{hip\_p}(\ )$: function that indicates a desired value of the angle $\theta_{hip\_p}$ of the hip joint forward-backward motor 3b, $A_p$: amplitude set up in advance for the sinusoidal function in the periodic movement, $\theta^{res}_{hip\_p}$: offset value concerning the angle of the hip joint forward-backward motor 3b, $\theta^d_{knee\_p}$: desired value of the angle $\theta_{knee\_p}$ of the knee joint forward-backward motor 4a, $\theta^d_{knee\_p}(\ )$: function that indicates a desired value of the angle $\theta_{knee\_p}$ of the knee joint forward-backward motor 4a, $\theta^{res}_{knee\_p}$: offset value concerning the angle of the knee joint forward-backward motor 4a, $\theta^d_{ankle\_p}(\ )$: function that indicates a desired value of the angle $\theta_{ankle\_p}$ of the ankle joint forward-backward motor 5b, $\theta^d_{ankle\_p}$: desired value of the angle $\theta_{ankle\_p}$ of the ankle joint forward-backward motor 5b, and $\theta^{res}_{ankle\_p}$: offset value concerning the angle of the ankle joint forward-backward motor 5b.

In Formulas 6 to 8, a state that the robot 1 does not perform movement such as the periodic movement and is stably in a stand-still and waiting state, that is, the reference position of the robot 1 is expressed by the offset values $\theta^{res}_{hip\_p}$, $\theta^{res}_{knee\_p}$, and $\theta^{res}_{ankle\_p}$. Then, movement is described as a relative displacement from the reference position.

Then, the desired value of the angle $\theta_{hip\_p}$ of the hip joint forward-backward motor 3b calculated according to Formula 6 is outputted from the drive control apparatus 6 to the hip joint drive mechanism 3 of the right limb 2. Then, on the basis of the received input of the desired value of the angle $\theta_{hip\_p}$, the hip joint drive mechanism 3 controls the hip joint forward-backward motor 3b so as to drive the hip joint. Here, the desired value of the angle $\theta_{hip\_p}$ of the hip joint forward-backward motor 3b of the left limb 2 is calculated by applying to Formula 6 a phase $\phi_{cL}(=\phi_c+\pi)$ having a difference $\pi$ [rad] from the phase $\phi_c$.

Then, the desired value of the angle $\theta_{knee\_p}$ of the knee joint forward-backward motor 4a calculated according to Formula 7 is outputted from the drive control apparatus 6 to the knee joint drive mechanism 4 of the right limb 2. Then, on the basis of the received input of the desired value of the angle $\theta_{knee\_p}$, the knee joint drive mechanism 4 controls the knee joint forward-backward motor 4a so as to drive the knee joint. Here, the desired value of the angle $\theta_{knee\_p}$ of the knee joint forward-backward motor 4a of the left limb 2 is calculated by applying to Formula 7 a phase $\phi_{cL}(=\phi_c+\pi)$ having a difference $\pi$ [rad] from the phase $\phi_c$.

Further, the desired value of the angle $\theta_{ankle\_p}$ of the ankle joint forward-backward motor 5b calculated according to Formula 8 is outputted from the drive control apparatus 6 to the ankle joint drive mechanism 5 of the right limb 2. Then, on the basis of the received input of the desired value of the angle $\theta_{ankle\_p}$, the ankle joint drive mechanism 5 controls the ankle joint forward-backward motor 5b so as to drive the ankle joint. Here, the desired value of the angle $\theta_{ankle\_p}$ of the ankle joint forward-backward motor 5b of the left limb 2 is calculated by applying to Formula 8 a phase $\phi_{cL}(=\phi_c+\pi)$ having a difference $\pi$ [rad] from the phase $\phi_c$.

In the robot 1 according to the present embodiment, a desired value of the angle of each joint is calculated according to Formulas 4 to 8 described above, and then the motor of each joint is controlled on the basis of the desired value, so that the phase concerning the control can be synchronized with the phase of the dynamical system of the robot 1. This permits stable stepping movement.

Further, in the robot 1 of the present embodiment, a desired value for control of the angle $\theta_{hip\_p}$ of the hip joint forward-backward motor 3b and a desired value for control of the angle $\theta_{ankle\_p}$ of the ankle joint forward-backward motor 5b are calculated with taking into consideration the step width from the stepping movement described above. Thus, the desired value of the angle of each motor calculated in a case that the walking movement is performed as the periodic movement.

In the walking movement, a desired value for control of the angle $\theta_{hip\_p}$ of the hip joint forward-backward motor 3b of the right limb 2 and a desired value for control of the angle $\theta_{ankle\_p}$ of the ankle joint forward-backward motor 5b are calculated by the drive control apparatus 6 from the following Formulas 9 and 10 on the basis of the phase $\phi_c$ concerning the control of the periodic movement of the drive control apparatus 6 calculated according to Formula 3.

$$\theta^d_{hip\_p} = A_p \sin(\phi_{c1}) + A_{hip\_s} \sin(\phi_{c2}) + \theta^{res}_{hip\_p} \quad \text{Formula 9}$$

$$\theta^d_{ankle\_p} = -A_p \sin(\phi_{c1}) - A_{ankle\_s} \sin(\phi_{c2}) + \theta^{res}_{ankle\_p} \quad \text{Formula 10}$$

where $A_{hip\_s}$: amplitude of the sinusoidal function set up in advance for walking movement, and $A_{ankle\_s}$: amplitude of the sinusoidal function set up in advance for walking movement.

Here, in Formulas 9 and 10, the relation $\phi_c = \phi_{c1} = \phi_{c2} \pi/2$ [rad] holds. That is, $\phi_{c1}$ and $\phi_{c2}$ has a phase difference of $\pi/2$ [rad]. Formula 9 is a formula in which the second term in the right-hand side has been added to Formula 6 of stepping movement. Formula 10 is a formula in which the second term in the right-hand side has been added to Formula 8 of stepping movement. Here, the desired value of the angle $\theta_{hip\_p}$ of the hip joint forward-backward motor 3b of the left limb 2 is calculated by applying to Formula 9 a phase $\phi_{c1L}$ ($=\phi_{c1}+\pi$) having a difference $\pi$ [rad] from the phase $\phi_{c1}$ and a phase ($\phi_{c2L}(=\phi_{c2}+\pi$) having a difference $\pi$ [rad] from the phase $\phi_{c2}$. Further, the desired value of the angle $\theta_{ankle\_p}$ of the ankle joint forward-backward motor 5b of the left limb 2 is calculated by applying to Formula 10 a phase $\phi_{c1L}$ ($=\phi_{c1}+\pi$) having a difference $\pi$ [rad] from the phase $\phi_{c1}$ and a phase $\phi_{c2L}$ ($=\phi_{c2}+\pi$) having a difference $\pi$ [rad] from the phase $\phi_{c2}$.

In the robot 1 according to the present embodiment, a desired value of the angle of each joint is calculated according to Formulas 4 to 6, Formula 7, and Formulas 9 and 10 described above, and then the motor of each joint is controlled on the basis of the desired value, so that the phase concerning the control can be synchronized with the phase of the dynamical system of the robot. This permits stable walking movement.

Figure 6:
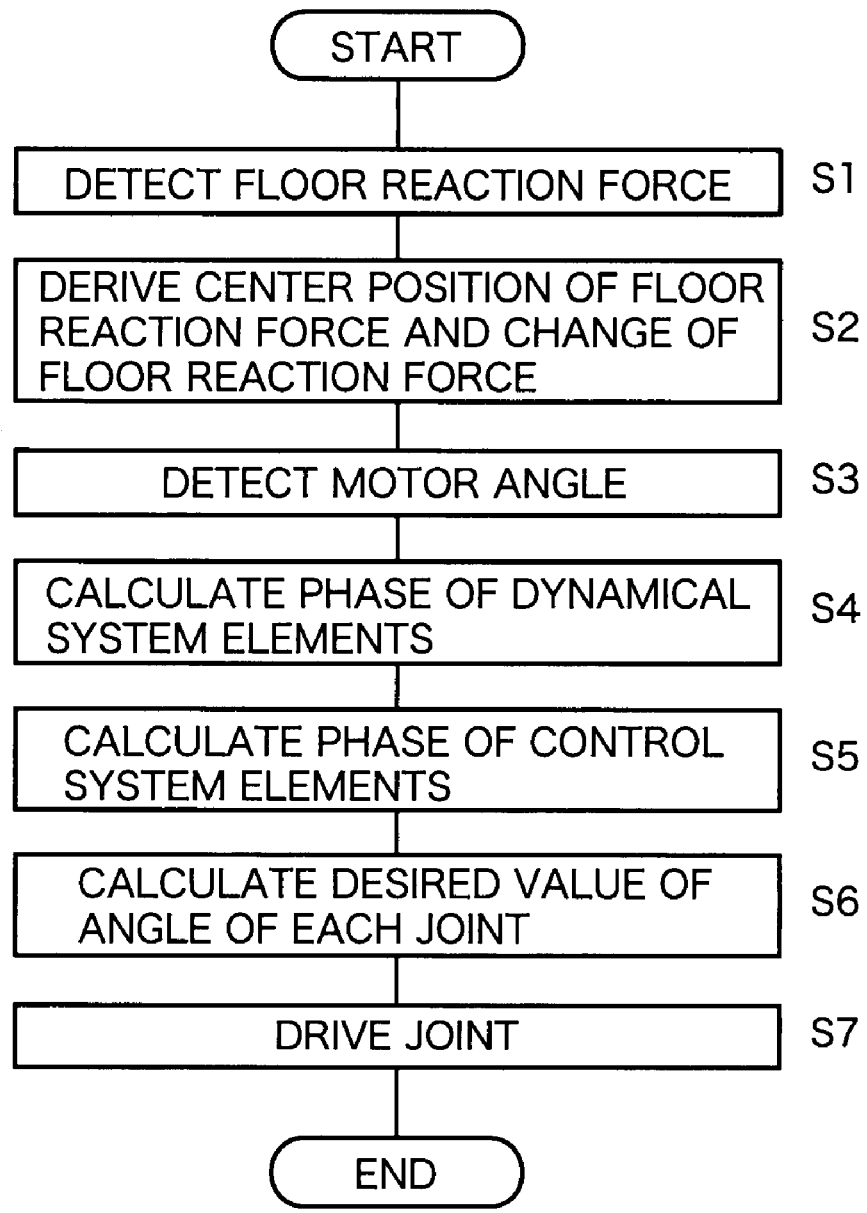
FIG. 6 is a flow chart showing periodic movement processing of a robot of the present embodiment.

FIG. 6 is a flow chart showing periodic movement processing of a robot 1 of the present embodiment. As described above, in the robot 1 according to the present embodiment, the floor reaction force detecting mechanisms 7 and 7 detect the loads to the ground contacting surfaces of the limbs 2 and 2 as the floor reaction forces (step S1). Then, on the basis of the detected loads, the drive control apparatus 6 derives the position of the floor reaction force center point and the amount of change of the floor reaction force center point (step S2). Further, in the robot 1, each joint mechanism detects the angle of each motor (step S3).

The robot 1 calculates the phase concerning the periodic movement of the dynamical system elements on the basis of the position of the floor reaction force center point and the amount of change of the floor reaction force center point having been derived (step S4), then calculates the phase of the control system elements on the basis of the calculated phase of the dynamical system elements (step S5), and then calculates the desired value of the angle of each joint on the basis of the calculated phase of the control system elements and the detected angle of the motor (step S6).

Then, the robot 1 drives the joint on the basis of the desired value of the angle of each calculated joint (step S7).

Figure 7A:
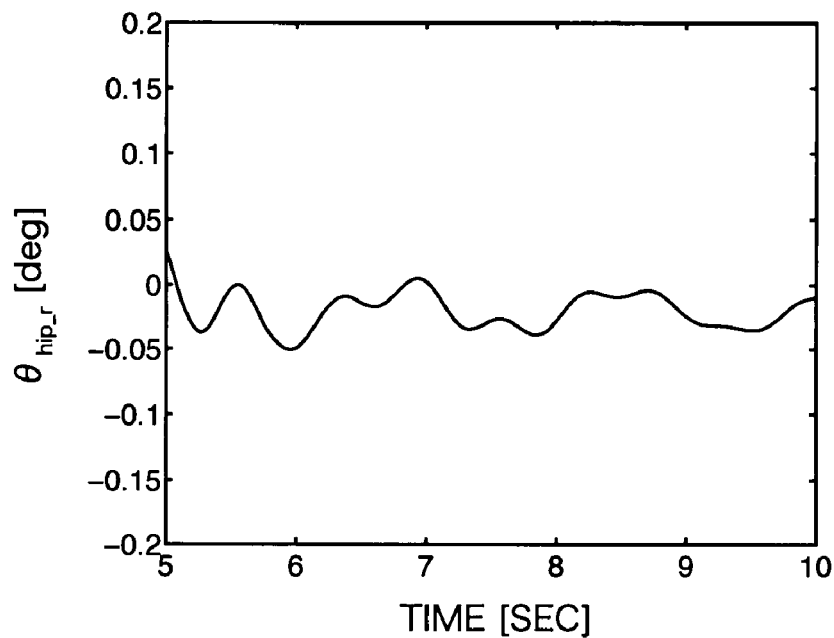
FIGS. 7A and 7B are graphs showing a time dependent change of a floor reaction force center point at the time of periodic movement of a robot.
Figure 7B:
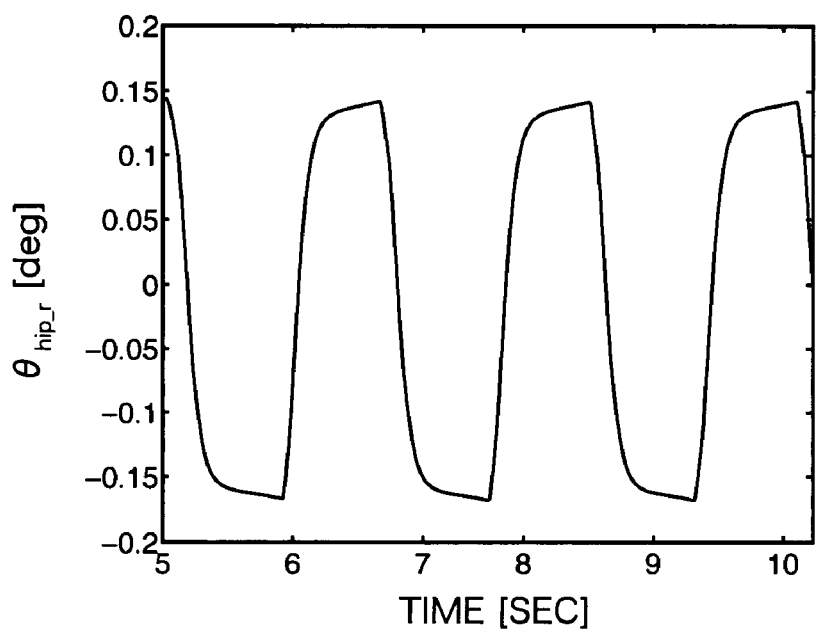

Next, experimental results on the robot of the present embodiment are described below. FIGS. 7A and 7B are graphs showing a time dependent change of a floor reaction force center point at the time of periodic movement of a robot. In FIGS. 7A and 7B, the vertical axis indicates the coordinate of the floor reaction force center point, while the time dependent change is shown for the floor reaction force center point at the time of stepping movement of the robot 1. The coordinate of the vertical axis is expressed by adopting as the zero reference point the coordinate of the floor reaction force center point of the case that the robot stands up. Further, the left direction of the robot 1 is defined as positive, while the value indicates the distance from the reference point. FIG. 7A shows an experimental result of a robot in which the driving method of the present embodiment is not employed, while FIG. 7B shows an experimental result of a robot in which the driving method of the present embodiment is employed. In the experiments, a robot having a height of 1.59 [m] and a total weight of 20 [g] was used. When the driving method of the present embodiment was employed, $A_{hip\_r}=3.0$ [deg], $A_{ankle\_r}=3.0$ [deg], $A_p=3.5$ [deg], and $K_c=9.4$ were adopted as the constants. The experiment was performed under the condition of an angular frequency of $\phi_c=3.6$ [rad/sec].

In FIG. 7A in which the driving method of the present embodiment is not employed, the floor reaction force center point moves irregularly. In contrast, in FIG. 7B in which the driving method of the present embodiment is employed, the floor reaction force center point moves regularly with a fixed period. This shows that when the driving method of the present embodiment is employed, the periodic behavior of the dynamical system elements of the robot can be controlled.

Figure 8A:
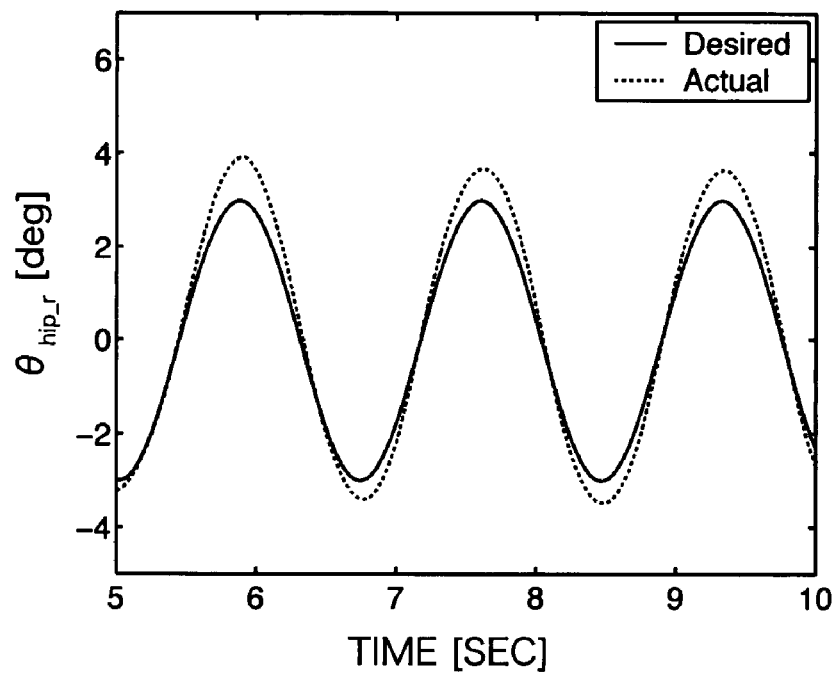
FIGS. 8A and 8B are graphs showing a time dependent change of an angle of a hip joint lateral motor at the time of periodic movement of a robot.
Figure 8B:
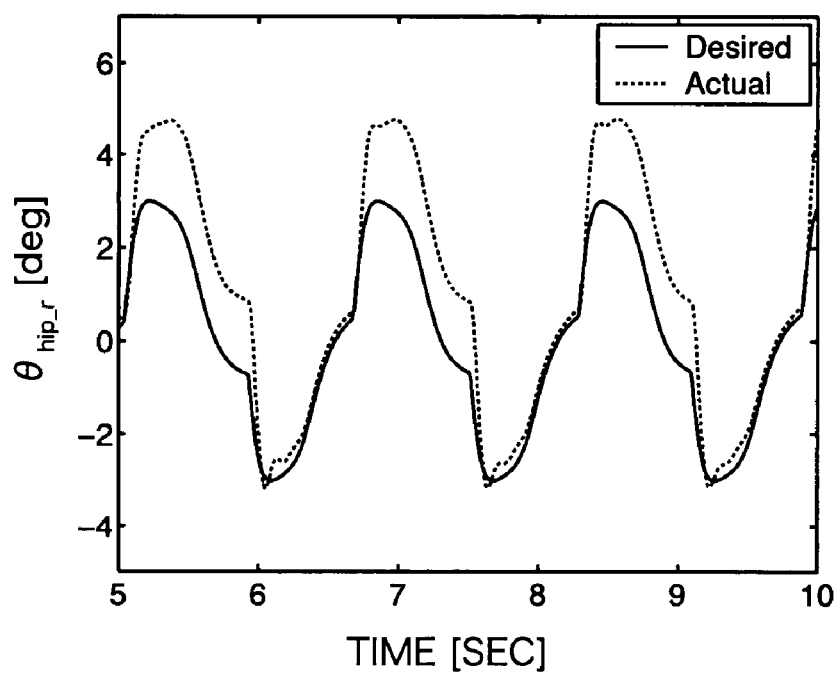

FIGS. 8A and 8B are graphs showing a time dependent change of the angle of a hip joint lateral motor at the time of periodic movement of a robot. The coordinate of the vertical axis is expressed by adopting as the zero reference point the angle of the hip joint lateral motor of the case that the robot stands up. The direction that the robot inclines to the left is defined as positive, while the value indicates the angle from the reference point. The solid line indicates the desired value of the angle, while the dashed line indicates the actually detected value of the actual angle. FIG. 8A shows an experimental result of a robot in which the driving method of the present embodiment is not employed, while FIG. 8B shows an experimental result of a robot in which the driving method of the present embodiment is employed. The setting values of the condition of the experiment were similar to those of the case of FIGS. 7A and 7B.

When the driving method of the present embodiment is applied to a robot in which the angle of the hip joint lateral motor operates with a period shown in FIG. 8A so that the phase of the hip joint lateral motor is controlled, the period of the hip joint lateral motor varies as shown in FIG. 8B. The period of the hip joint lateral motor shown in FIG. 8B agrees approximately with the period of the floor reaction force center point shown in FIG. 7B. This shows that when the driving method of the present embodiment was employed, the phase concerning the control system elements has been synchronized with the phase concerning the dynamical system elements of the robot.

Figure 9A:
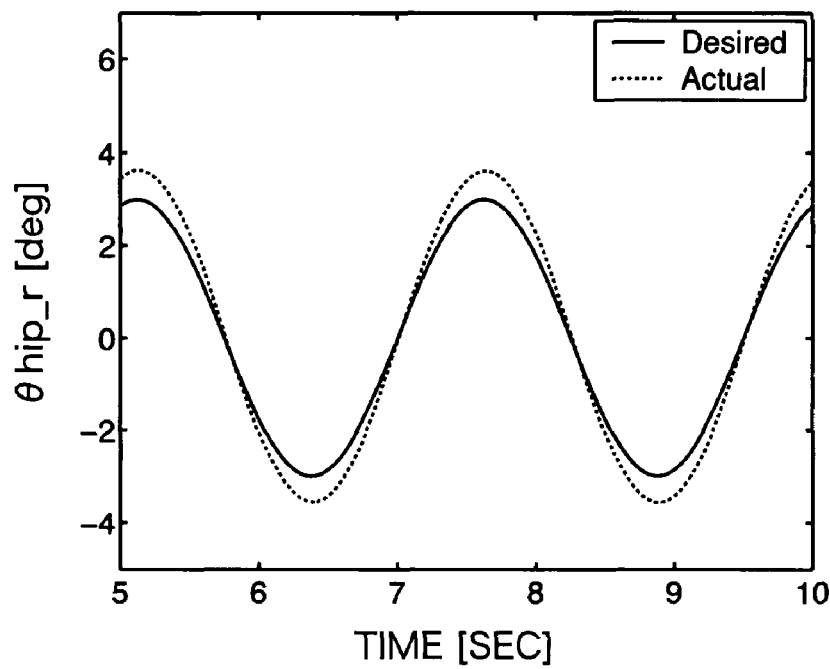
FIGS. 9A and 9B are graphs showing a time dependent change of the angle of a hip joint lateral motor at the time of periodic movement of a robot.
Figure 9B:
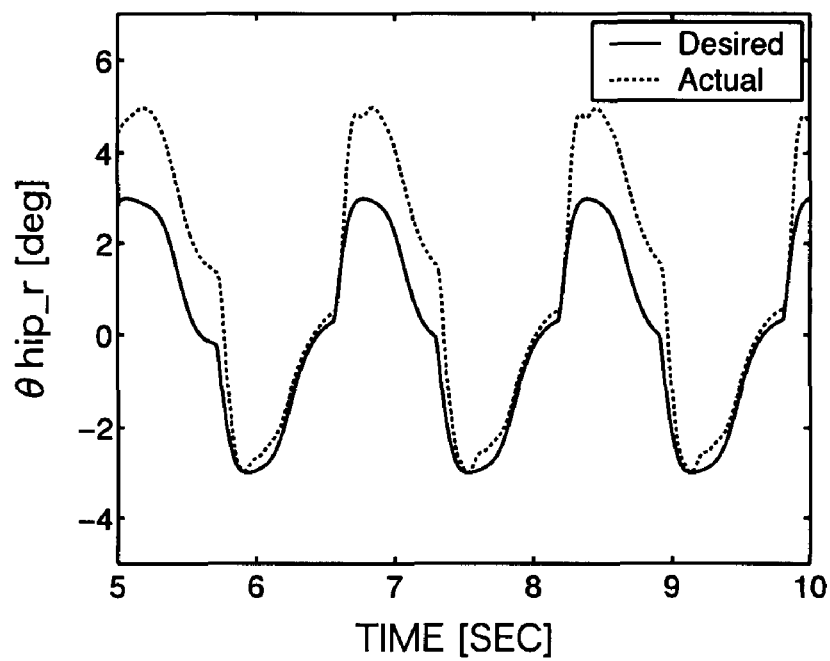

FIGS. 9A and 9B are graphs showing a time dependent change of the angle of a hip joint lateral motor at the time of periodic movement of a robot. FIGS. 9A and 9B show experimental results in which the condition of the angular frequency was changed from that of FIGS. 8A and 8B into $\omega_c=3.6$ [rad/sec]. Here, FIG. 9A shows an experimental result of a robot in which the driving method of the present embodiment is not employed, while FIG. 9B shows an experimental result of a robot in which the driving method of the present embodiment is employed.

When the driving method of the present embodiment is applied to a robot in which the angle of the hip joint lateral motor operates with a period shown in FIG. 9A so that the phase of the hip joint lateral motor is controlled, the period of the hip joint lateral motor varies as shown in FIG. 9B. The period of the hip joint lateral motor shown in FIG. 9B agrees approximately with the period of the hip joint lateral motor shown in FIG. 8B. This shows that when the driving method of the present embodiment is employed, even in a case that the initial condition of the control system elements is changed, the phase concerning the control system elements has been synchronized with the phase concerning the dynamical system elements of the robot.

Further, in addition to the experiments described above, experiments have been performed on the walking movement of the robot of the present embodiment that employs the driving method of the present embodiment. According to a result, even in the case of walking on a floor having a level difference, the walking has been achieved without losing the balance. When the floor has a level difference, a change arises in the time of the departing duration. However, this experimental result shows that in the robot of the present embodiment, the phase of the control system elements was autonomously synchronized with the change of the phase of the dynamical system elements associated with the change of the departing duration, so that stable walking movement has been achieved.

Further, an experiment was carried out that walking was performed on a succession of a floor composed of plastics, a floor composed of rubber, and a floor composed of metal. According to the result, even when walking was performed on a floor where the construction material, that is, the coefficient of friction, varies, the walking has been achieved without losing the balance. This shows that even in the case of a change in the coefficient of friction of the floor, when the phase of the control system elements was adjusted, stable walking movement has been achieved.

Further, in the walking movement experiments of the robot of the present embodiment, walking movement has been achieved in a state that the joints such as the knee-joints are stretched.

The above-mentioned embodiment has been given for the case of a robot having three joints that swing forward and backward and two joints that swing left and right. However, the present invention is not limited to this. The direction and the number of the joints may be set up arbitrarily. Further, when the setting values such as the amplitude are set up arbitrarily, walking movement having various values of step width, speed, and the posture can be implemented.

Further, the above-mentioned embodiment has been given for the case of a robot having one pair of limbs (that is, two limbs). However, the present invention is not limited to this. The present invention may be applied to a robot having multiple limbs such as 4 and 6. For example, when the present invention is applied to a robot having the four limbs, each pair of diagonal limbs may be recognized as a pair of limbs, so that the robot may still be recognized as a virtual biped walking robot. Then, the present invention may be applied.

Further, the coordinate x of the floor reaction force center point COP is derived by the Formula 1 in the above-mentioned embodiment. However, the present invention is not limited to this. The difference between $F^l_z$ and $F^r_z$, which represent the load from the ground contacting surface to the left limb 2 and the right limb 2 of the robot 1 respectively, can be used as a replacement for the coordinate x of the Formula 1.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for driving a robot having plural limbs each of which have plural joints, comprising the steps of:
    causing the robot to perform periodic movements on a floor by means of its plural limbs;
    detecting over time floor reaction forces received through the plural limbs contacting the floor during the periodic movement;
    deriving a current center position of the floor reaction forces detected during movement and a change of the center position over time;
    calculating desired angles of the plural joints directly based on the derived current center position and the derived change, without deriving a desired center position indicating the center position at a future time;
    controlling the plural joints based on the calculated desired angles; and
    driving the robot with the controlled plural joints.

2. The driving method according to claim 1, wherein the desired value of the angle of the plural joints is calculated directly based on the derived center position and the derived change.

3. A drive control apparatus for controlling a robot having plural limbs, each of which has plural joints, comprising a controller capable of performing operations of:
    causing the robot perform periodic movement on a floor by means of its plural limbs;
    detecting over time floor reaction forces received through the plural limbs contacting the floor during the periodic movement;
    deriving a current center position of the floor reaction forces detected and a change of the center position from past to current;
    calculating desired angles of the plural joints directly based on the derived center position and the derived change, without deriving a desired center position indicating the center position at a future time;
    outputting a desired control value to the drive mechanism; and
    driving the robot with the controlled plural joints.

4. The drive control apparatus according to claim 3, wherein the desired value of the angle of the plural joints is calculated using a sinusoidal function which includes a variable based on the current derived center position and the derived change from past to current.

5. A drive control apparatus for a robot having plural limbs each of which has plural joints that performs periodic movement by periodically driving the joints of a plurality of limbs, comprising:
    means for causing the robot to perform periodic movement on a floor by means of its plural limbs;
    means for detecting over time the floor reaction forces received through the plural limbs contacting the floor during the periodic movement;
    means for deriving a current center position of the floor reaction forces detected and a change of the center position from past to current;
    means for calculating desired angles of the plural joints directly based on the derived center position and the derived change, without deriving a desired center position indicating the center position at a future time;
    means for outputting a desired control value to the drive mechanism; and
    a means for driving the robot with the controlled plural joints.

6. The drive control apparatus according to claim 5, wherein the desired value of the angle of the plural joints is calculated using a sinusoidal function which includes a variable based on the current derived center position and the derived change from past to current.

7. A robot comprising:
    a plurality of limbs each having plural joints;
    making the robot perform periodic movement on a floor by means of its plural limbs;
    a detecting section for detecting over time floor the reaction forces; and
    a controller capable of performing operations of;
    deriving a center position of reaction forces detected at a current time and a change of the center position from past to current;
    calculating desired angles of the plural joints directly based on the derived center position and the derived change, without deriving a desired center position indicating the center position at a future time;

outputting a desired control value to the drive mechanism;

wherein, in accordance with the desired control value output from said controller, said driving section drives said plural joints periodically so that periodic movement is performed.

8. The robot according to claim 7, wherein said periodic movement performed by driving of the plural joints of the limbs is a walking movement or a stepping movement.

9. The robot according to claim 7, wherein said driving section has two motors, one of the motors swinging one of the plural joints in a first direction and the other of the motors swinging said one of the plural joints in a second direction which crosses the first direction.

10. The robot according to claim 7, wherein said limb has a hip joint, a knee joint and an ankle joint.

11. The robot according to claim 7, further comprising a plurality of detecting sections for detecting a reaction force received by each limb from the ground contacting part, wherein said controller is capable of deriving the center position of the reaction forces received from the ground contacting parts and the change in the center position based on the reaction force detected by each detecting section.

12. The robot according to claim 7, wherein the desired value of the angle of the plural joints is calculated using a sinusoidal function which includes a variable based on the current derived center position and the derived change from past to current.

13. The robot according to claim 7, wherein said controller is capable of calculating the desired value of the angle of the plural joints directly based on a sinusoidal function.

14. A robot comprising:

a plurality of limbs each having plural joints;

a means for causing the robot to perform periodic movement on a floor by means of its plural limbs;

a driving section for driving said joints periodically;

means for detecting over time floor reaction forces received through plural limbs contacting the floor during the periodic movement;

a means for deriving a center position of the floor reaction forces detected at a current time and a change of the center position from past to current;

means for calculating desired angles of the plural joints directly based on the derived center position and the derived change, without deriving a desired center position indicating the center position at a future time;

means for outputting a desired control value to the drive mechanism; wherein in accordance with the outputted desired control value, said driving section drives said plural joints periodically so that periodic movement is performed.

15. The robot according to claim 14, wherein said periodic movement performed by driving of the joints of the limbs is a walking movement or a stepping movement.

16. The robot according to claim 14, wherein said driving section has two motors, one of the motors swinging one of the plural joints in a first direction and the other of the motors swinging said one of the plural joints in a second direction which crosses the first direction.

17. The robot according to claim 14, wherein said limb has a hip joint, a knee joint and an ankle joint.

18. The robot according to claim 14, further comprising a plurality of detecting sections for detecting a reaction force received by each limb from the ground contacting part, wherein the center position of the reaction forces received from the ground contacting parts and the change in the center position is derived based on the detected reaction force by each detecting section.

19. The robot according to claim 14, wherein the desired value of the angle of the plural joints is calculated using a sinusoidal function which includes a variable based on the current derived center position and the derived change from past to current.

20. The robot according to claim 14, wherein the desired value of the angle of the plural joints is calculated directly based on a sinusoidal function.

* * * * *